(12) United States Patent
Peng

(10) Patent No.: US 12,523,805 B2
(45) Date of Patent: Jan. 13, 2026

(54) QUANTUM DOT COLOR FILTER SUBSTRATE, MANUFACTURING METHOD THEREOF, AND DISPLAY PANEL

(71) Applicant: Shenzhen China Star Optoelectronics Semiconductor Display Technology Co., Ltd., Guangdong (CN)

(72) Inventor: Wenxiang Peng, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 1244 days.

(21) Appl. No.: 16/981,715

(22) PCT Filed: Aug. 4, 2020

(86) PCT No.: PCT/CN2020/106699
§ 371 (c)(1),
(2) Date: Sep. 17, 2020

(87) PCT Pub. No.: WO2022/000692
PCT Pub. Date: Jan. 6, 2022

(65) Prior Publication Data
US 2022/0003903 A1   Jan. 6, 2022

(30) Foreign Application Priority Data
Jul. 1, 2020  (CN) .......................... 202010621403.3

(51) Int. Cl.
*G02B 5/20*       (2006.01)
*B41M 7/00*       (2006.01)
(Continued)

(52) U.S. Cl.
CPC ............ *G02B 5/201* (2013.01); *B41M 7/009* (2013.01); *C09D 11/322* (2013.01);
(Continued)

(58) Field of Classification Search
CPC .. G02B 5/201; G02B 2207/101; B41M 7/009; C09D 11/322; C09K 11/613;
(Continued)

(56) References Cited

U.S. PATENT DOCUMENTS

2013/0194523 A1\* 8/2013 Long ........................ H05B 3/84
  156/60
2019/0212610 A1  7/2019 Kim et al.
(Continued)

FOREIGN PATENT DOCUMENTS

CN          202472182         10/2012
CN          105353554         2/2016
(Continued)

*Primary Examiner* — Benjamin Tzu-Hung Liu

(57) ABSTRACT

A quantum dot color filter substrate includes a substrate, a color filter layer, a quantum dot film layer, and a transparent conductive layer disposed between the color filter layer and the quantum dot film layer. The transparent conductive layer is externally connected to a power module to form a closed circuit. When a voltage is applied to the transparent conductive layer, the transparent conductive layer may generate heat, which can quickly remove solvents in a quantum dot film layer.

18 Claims, 2 Drawing Sheets

(51) Int. Cl.
- *B82Y 20/00* (2011.01)
- *B82Y 30/00* (2011.01)
- *C09D 11/322* (2014.01)
- *C09K 11/61* (2006.01)
- *G02F 1/017* (2006.01)
- *G02F 1/1335* (2006.01)
- *G02F 1/13357* (2006.01)
- *H10K 59/38* (2023.01)

(52) U.S. Cl.
CPC ........ *C09K 11/613* (2013.01); *G02F 1/01791* (2021.01); *G02F 1/133516* (2013.01); *G02F 1/133602* (2013.01); *H10K 59/38* (2023.02); *B82Y 20/00* (2013.01); *B82Y 30/00* (2013.01); *G02B 2207/101* (2013.01); *G02F 2202/16* (2013.01)

(58) Field of Classification Search
CPC ........... G02F 1/01791; G02F 1/133516; G02F 1/133602; G02F 2202/16; H10K 59/38; B82Y 20/00; B82Y 30/00
See application file for complete search history.

(56) References Cited

U.S. PATENT DOCUMENTS

| | | | | |
|---|---|---|---|---|
| 2019/0378873 A1* | 12/2019 | Lee | ..................... | H01L 25/0655 |
| 2020/0083303 A1* | 3/2020 | Bok | ........................ | H10F 19/80 |
| 2021/0036062 A1* | 2/2021 | Kim | ..................... | H10K 50/865 |

FOREIGN PATENT DOCUMENTS

| | | |
|---|---|---|
| CN | 105428554 | 3/2016 |
| CN | 108922906 | 11/2018 |
| CN | 110085750 | 8/2019 |
| CN | 110262114 | 9/2019 |
| CN | 110943181 | 3/2020 |
| CN | 111341816 | 6/2020 |

\* cited by examiner

QUANTUM DOT COLOR FILTER SUBSTRATE, MANUFACTURING METHOD THEREOF, AND DISPLAY PANEL

CROSS REFERENCE TO RELATED APPLICATIONS

This application is a National Phase of PCT Patent Application No. PCT/CN2020/106699 having International filing date of Aug. 4, 2020, which claims the benefit of priority of Chinese Patent Application No. 202010621403.3 filed on Jul. 1, 2020. The contents of the above applications are all incorporated by reference as if fully set forth herein in their entirety.

FIELD AND BACKGROUND OF THE INVENTION

The present disclosure relates to the field of display technologies, and particularly relates to a quantum dot color filter substrate, a manufacturing method thereof, and a display panel.

In recent years, perovskite materials have attracted great attention from academia and industry because of advantages of high defect tolerance, high fluorescence quantum efficiency, adjustable optical band gap, and high carrier mobility. At present, a notarization efficiency of perovskite solar cells is more than 24%. The perovskite materials can not only be used as light-absorbing materials applied in the field of photoelectricity, but also excellent luminescent materials, which are gradually being used in the field of light-emitting and display.

A luminescence spectrum of the perovskite materials can change with a change of the X element in $ABX_3$, so it is easy to obtain the perovskite materials emitting red or green light. In addition, the luminescence spectrum of the perovskite materials is very narrow, which also greatly helps to improve a color gamut of display devices. Based on the above advantages of the perovskite materials, an introduction of the perovskite materials into light-emitting diode (LED) display devices can greatly improve a color gamut thereof.

A perovskite film layer can be prepared by inkjet printing (IJP). However, the perovskite ink includes a large amount of solvents, so it is necessary to remove the solvents in the perovskite ink after printing. A common method is to directly bake the printed ink by heating a hot stage. However, the method is not only time-consuming but also low in energy efficiency.

SUMMARY OF THE INVENTION

Embodiments of the present disclosure provide a quantum dot color filter substrate, a manufacturing method thereof, and a display panel to solve a technical problem that in a display panel of prior art, during a process of preparing a perovskite film layer by inkjet printing, solvents in the ink after printing are removed by baking the ink with a hot stage, which is not only time-consuming but also low in energy efficiency, thereby increasing production costs.

Technical Solutions

To solve the above problems, technical solutions provided by the present disclosure are as followings:

An embodiment of the present disclosure provides a quantum dot color filter substrate including a substrate, a color filter layer disposed on the substrate, a quantum dot film layer disposed on the color filter layer, and a transparent conductive layer disposed between the color filter layer and the quantum dot film layer. The color filter layer includes a plurality of red color resists, green color resists, and blue color resists arranged in an array. The transparent conductive layer is externally connected to a power module, and a closed circuit is formed by the transparent conductive layer and the power module.

In at least one embodiment of the present disclosure, a protective layer is disposed between the transparent conductive layer and the color filter layer.

In at least one embodiment of the present disclosure, the quantum dot film layer is disposed on a surface of a side of the transparent conductive layer facing away from the color filter layer.

In at least one embodiment of the present disclosure, the quantum dot film layer includes a plurality of red quantum dot film layers, green quantum dot film layers, and transparent film layers arranged in an array.

In at least one embodiment of the present disclosure, each of the red quantum dot film layers corresponds to one of the red color resists, each of the green quantum dot film layers corresponds to one of the green color resists, and each of the transparent film layers corresponds to one of the blue color resists.

In at least one embodiment of the present disclosure, a plurality of pixel definition layers are disposed on the transparent conductive layer at intervals, and the red quantum dot film layers, the green quantum dot film layers, and the transparent film layers are separately disposed in accommodation spaces defined by the pixel definition layers.

In at least one embodiment of the present disclosure, a resistance of the transparent conductive layer ranges from 10 ohms per square meter to 18 ohms per square meter.

In at least one embodiment of the present disclosure, adjacent resists of the color filter layer are separated by a black matrix.

An embodiment of the present disclosure further provides a display panel including a backlight and a quantum dot color filter substrate, and the quantum dot color filter substrate includes a substrate, a color filter layer disposed on the substrate, a quantum dot film layer disposed on the color filter layer, and a transparent conductive layer disposed between the color filter layer and the quantum dot film layer. The color filter layer includes a plurality of red color resists, green color resists, and blue color resists arranged in an array. The transparent conductive layer is externally connected to a power module, and a closed circuit is formed by the transparent conductive layer and the power module.

In at least one embodiment of the present disclosure, the quantum dot color filter substrate is disposed on the backlight.

In at least one embodiment of the present disclosure, the backlight is one of a blue organic light-emitting diode (OLED), a blue micro light-emitting diode (micro-LED), and a blue mini light-emitting diode (mini-LED).

In at least one embodiment of the present disclosure, a protective layer is disposed between the transparent conductive layer and the color filter layer.

In at least one embodiment of the present disclosure, the quantum dot film layer is disposed on a surface of a side of the transparent conductive layer facing away from the color filter layer.

In at least one embodiment of the present disclosure, the quantum dot film layer comprises a plurality of red quantum dot film layers, green quantum dot film layers, and transparent film layers arranged in an array.

In at least one embodiment of the present disclosure, each of the red quantum dot film layers corresponds to one of the red color resists, each of the green quantum dot film layers corresponds to one of the green color resists, and each of the transparent film layers corresponds to one of the blue color resists.

In at least one embodiment of the present disclosure, a plurality of pixel definition layers are disposed on the transparent conductive layer at intervals, and the red quantum dot film layers, the green quantum dot film layers, and the transparent film layers are separately disposed in accommodation spaces defined by the pixel definition layers.

An embodiment of the present disclosure further provides a manufacturing method of the above quantum dot color filter substrate, the manufacturing method includes following steps:
  S10, providing a substrate with a color filter layer formed thereon;
  S20, forming a transparent conductive layer on the color filter layer;
  S30, connecting the transparent conductive layer and a power module to form a closed circuit;
  S40, forming a quantum dot film layer on the transparent conductive layer; and
  S50, applying a voltage to the transparent conductive layer to remove solvents in the quantum dot film layer.

In at least one embodiment of the present disclosure, the S40 includes:
  printing a red quantum dot ink on the transparent conductive layer;
  printing a green quantum dot ink on the transparent conductive layer; and
  printing a blank ink comprising scattering particles on the transparent conductive layer.

In at least one embodiment of the present disclosure, solvents of the red quantum dot ink, solvents of the green quantum dot ink, and solvents of the blank ink are all N, N-dimethylformamide.

In at least one embodiment of the present disclosure, an orthographic projection of the quantum dot film layer on the transparent conductive layer is positioned in the transparent conductive layer.

Beneficial Effects

A transparent conductive layer is disposed under a quantum dot film layer and is externally connected to a power module to form a closed circuit. In the closed circuit, the transparent conductive layer is equivalent to a resistor, when a voltage is applied to the transparent conductive layer, the transparent conductive layer may generate heat, which can quickly remove solvents in a quantum dot film layer.

BRIEF DESCRIPTION OF THE SEVERAL VIEWS OF THE DRAWINGS

The accompanying drawings to be used in the description of embodiments of the present disclosure or prior art will be described in brief to more clearly illustrate the technical solutions of the embodiments or the prior art. Obviously, the accompanying drawings described below are only part of the embodiments of the present disclosure, for those of ordinary skill in the art, other drawings can be obtained from these drawings without creative work.

DESCRIPTION OF SPECIFIC EMBODIMENTS OF THE INVENTION

The present disclosure provides a quantum dot filter substrate, a manufacturing method thereof, and a display panel. In order to make the purpose, technical solutions, and effects of the present disclosure clearer, the present disclosure will be further described in detail below with reference to the accompanying drawings and embodiments. It should be understood that specific embodiments described herein are merely used to explain the present disclosure and are not intended to limit the present disclosure.

Figure 1:
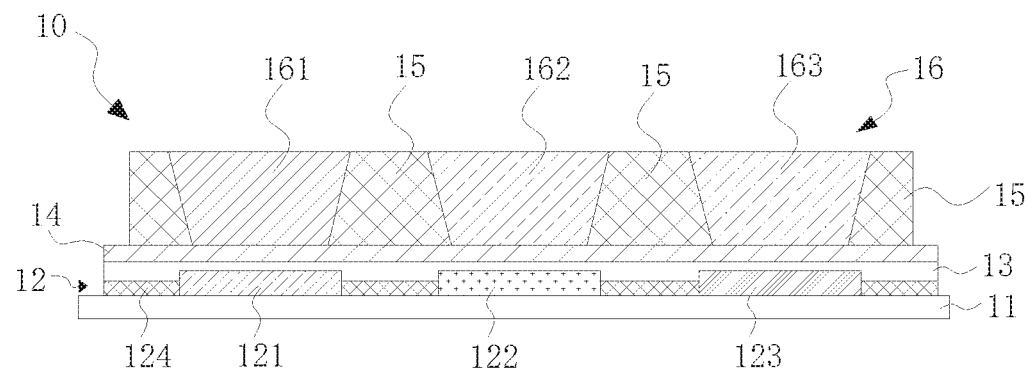
FIG. 1 is a schematic view of a quantum dot color filter substrate provided by an embodiment of the present disclosure.

As shown in FIG. 1, an embodiment of the present disclosure provides a quantum dot color filter substrate 10, the quantum dot color filter substrate 10 includes a substrate 11, a color filter layer 12 disposed on the substrate 11, a quantum dot film layer 16 disposed on the color filter layer 12, and a transparent conductive layer 14 disposed between the color filter layer 12 and the quantum dot film layer 16.

Figure 2:
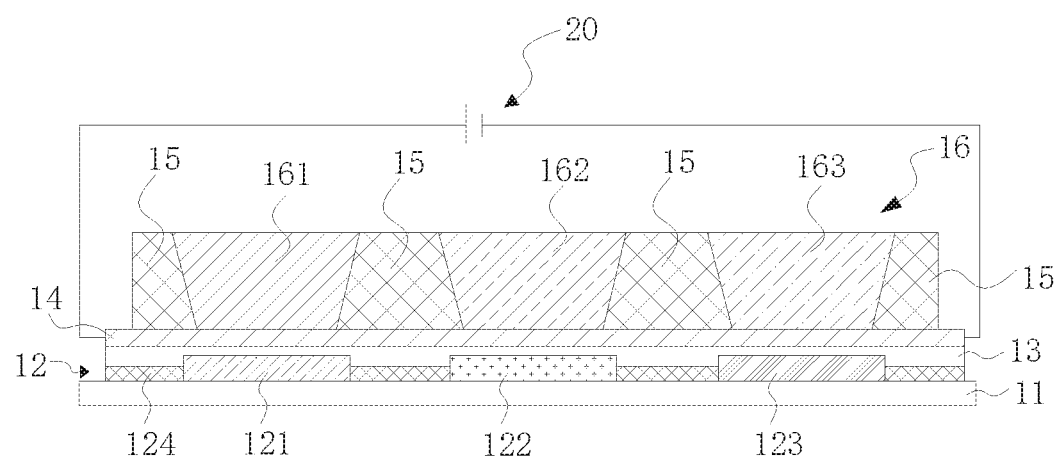
FIG. 2 is another schematic view of a quantum dot color filter substrate provided by an embodiment of the present disclosure.

As shown in FIG. 2, the transparent conductive layer 14 is externally connected to a power module 20, and a closed circuit is formed by the transparent conductive layer 14 and the power module 20.

The quantum dot film layer 16 includes a plurality of red quantum dot film layers 161, green quantum dot film layers 162, and transparent film layers 163 arranged in an array.

Materials of the red quantum dot film layers 161 and materials of the green quantum dot film layers 162 are all perovskite materials, and the perovskite materials are $MAPbX_3$ (the X is one or more of chlorine (Cl), bromine (Br), and iodine (I)). A luminescence spectrum of the perovskite materials can change with a change of the X element in $CsPbX_3$, so the perovskite materials emitting red or green light can be obtained by various combinations of X elements. Materials of the transparent film layers 163 includes scattering particles, and scattering ink of the transparent film layers 163 can be prepared in a way that the perovskite materials in the red quantum dot film layers or the green quantum dot film layers are replaced with silicon dioxide ($SiO_2$) or titanium dioxide ($TiO_2$).

In an embodiment of the present disclosure, the red quantum dot film layers 161, the green quantum dot film layers 162, and the transparent film layers 163 are prepared by inkjet printing. Because perovskite ink used in inkjet printing includes a large amount of solvents, and the solvents of the perovskite ink needs to be removed after inkjet printing. In the embodiment of the present disclosure, a voltage is applied to the transparent conductive layer 14 to make the transparent conductive layer 14 (equivalent to a heating resistance wire) generate heat, and the heat acts on upper layers of the red quantum dot film layers 161, the green quantum dot film layers 162, and the transparent film layers 163, so that the solvents can be heated and volatilized to achieve rapid current annealing. Compared with a method of heating and baking by a hot stage in the prior art, the method of current heating in the embodiment can not only quickly heat a film formed by inkjet printing, but also has effects of uniform heating and energy saving.

In the embodiment, materials of the transparent conductive layer 14 may be indium tin oxide (ITO) or fluorine tin oxide (FTO).

A resistance of the transparent conductive layer 14 ranges from 10 ohms per square meter (Ω/sq) to 18 Ω/sq.

During removing the solvents, when the voltage applied by the power module 20 to the transparent conductive layer 14 ranges from 18 volts to 24 volts, rapid current annealing can be achieved.

Furthermore, a protective layer 13 may be further disposed between the transparent conductive layer 14 and the color filter layer 12, and the protective layer 13 is used to block water and oxygen corrosion.

Materials of the protective layer 13 may be $SiO_2$, $SiN_x$, or a combination thereof.

While the protective layer 13 is provided, the quantum dot film layer 16 is disposed on a surface of a side of the transparent conductive layer 14 facing away from the color filter layer 12, so that the quantum dot film layer 16 can be sufficiently heated during a process of removing the solvents.

The materials of the red quantum dot film layers 161 may be $CH_3NH_3PbBr_xI_{3-x}$ (or $CsPbBr_xI_{3-x}$), a value of the X is an integer ranging from 1 to 3, and the red quantum dot film layers 161 emit red light. The materials of the green quantum dot film layers 162 may be $CH_3NH_3PbBr_3$ (or $CsPbBr_3$), and the green quantum dot film layers 162 emit green light.

The color filter layer 12 includes a plurality of red color resists 121, green color resists 122, and blue color resists 123 arranged in an array.

Each of the red quantum dot film layers 161 corresponds to one of the red color resists 121, each of the green quantum dot film layers 162 corresponds to one of the green color resists 122, and each of the transparent film layers 163 corresponds to one of the blue color resists 123.

A plurality of color resists of the color filter layer 12 are not only used to filter a backlight not completely absorbed, but also block external light, thereby reducing an excitation effect of the external light on the perovskite materials.

Adjacent color resists may be separated by a black matrix 124 to prevent light crosstalk.

A plurality of pixel definition layers 15 may be disposed on the transparent conductive layer 14 at intervals, and the red quantum dot film layers 161, the green quantum dot film layers 162, and the transparent film layers 163 are separately disposed in accommodation spaces defined by the pixel definition layers 15.

Materials of the pixel definition layers 15 may be as the same as materials of the black matrix 124, and may be black photoresist materials.

Figure 3:
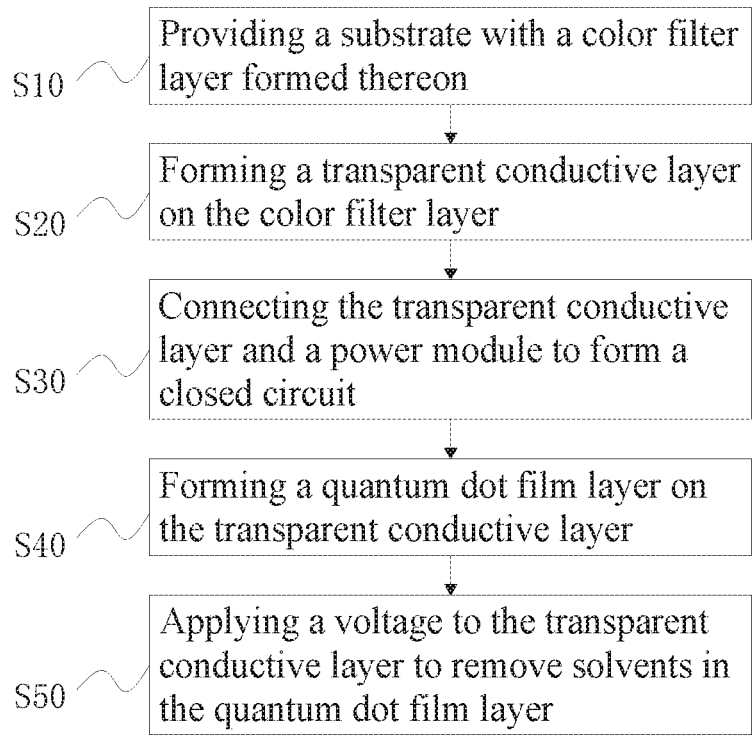
FIG. 3 is a flowchart of a manufacturing method of a quantum dot color filter substrate provided by an embodiment of the present disclosure.

As shown in FIG. 3, a manufacturing method of the above quantum dot color filter substrate 10 provided by an embodiment of the present disclosure includes following steps:

S10, providing a substrate 11 with a color filter layer 12 formed thereon;

S20, forming a transparent conductive layer 14 on the color filter layer 12;

S30, connecting the transparent conductive layer 14 and a power module 20 to form a closed circuit;

S40, forming a quantum dot film layer 16 on the transparent conductive layer 14; and S50, applying a voltage to the transparent conductive layer 14 to remove solvents in the quantum dot film layer 16.

A preparation of the transparent conductive layer 14 includes evaporating an ITO material or FTO material on the color filter layer 12 to form the transparent conductive layer 14. The transparent conductive layer 14 may be evaporated on an entire surface or may be patterned, but it should be ensured that an orthographic projection of subsequently formed quantum dot film layer 16 on the transparent conductive layer 14 is positioned in the transparent conductive layer 14, thereby achieving a current heating of the transparent conductive layer 14.

A preparation of the quantum dot film layer 16 includes: printing a red quantum dot ink on the transparent conductive layer 14, printing a green quantum dot ink on the transparent conductive layer 14, and printing a blank ink including scattering particles on the transparent conductive layer 14.

Before printing ink, pixel definition layers 15 may be prepared, and a method for preparing the pixel definition layers 15 specifically includes coating a black photoresist on the transparent conductive layer 14 and patterning by a photomask process to form the pixel definition layers 15 at intervals. Accommodation spaces are defined between adjacent pixel definition layers 15, and the accommodation spaces correspond to the plurality of resists of the color filter layer 12 one to one.

Inkjet printing has advantages of controlling a position and a volume of the ink dropped, so the ink can be printed into a film in a pixel-level area. The red quantum dot ink, the green quantum dot ink, and the blank ink may be printed in the accommodation spaces by inkjet printing.

In the embodiment, $CH_3NH_3PbBr_xI_{3-x}$ (or $CsPbBr_xI_{3-x}$) and $CH_3NH_3PbBr_3$ (or $CsPbBr_3$) are used as a red luminescent material and green luminescent material, respectively.

In the embodiment, a synthetic route of $MAPbX_3$ precursor fluid for printing is shown in a following formula:

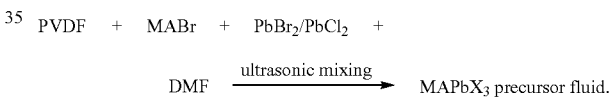

A manufacturing method of the red quantum dot ink includes mixing polyvinylidene fluoride (PVDF), $CH_3NH_3Br$ (MABr), $PbBr_2$, $PbI_2$, and N, N-Dimethylformamide (DMF) and performing ultrasonic dispersion to obtain the red quantum dot ink for subsequent printing. Wherein, the MABr can be replaced with CsBr.

A manufacturing method of the green quantum dot ink includes mixing PVDF, MABr, and DMF and performing ultrasonic dispersion to obtain the green quantum dot ink for subsequent printing. Wherein, the MABr can also be replaced with CsBr.

The blank ink includes scattering particles, such as titanium dioxide, to widen a blue viewing angle. The blank ink can be directly obtained by replacing perovskite materials in the red or green ink with DMF solvents including the scattering particles.

Because the quantum dot film layer 16 formed by inkjet printing includes a large amount of DMF solvents, it is necessary to remove the DMF solvents. By applying the voltage to the transparent conductive layer 14, an entire of the transparent conductive layer 14 is equivalent to a heating resistor wire, and the transparent conductive layer 14 can generate heat and act the heat on an upper layer of quantum dot film layer 16, so that the DMF solvents can be heated and volatilized.

A resistance of the transparent conductive layer 14 may range from 10 Ω/sq to 18 Ω/sq. During removing the solvents, the voltage applied by the power module 20 to the transparent conductive layer 14 may range from 18 volts to 24 volts.

In the embodiment, the resistance of the transparent conductive layer 14 may be 14 Ω/sq, and the voltage may be 20 volts, which can achieve rapid current annealing.

Before preparing the transparent conductive layer 14, a protective layer 13 may be further formed on the color filter layer 12 to block water and oxygen corrosion, and then the transparent conductive layer 14 may be prepared on the protective layer 13.

Figure 4:
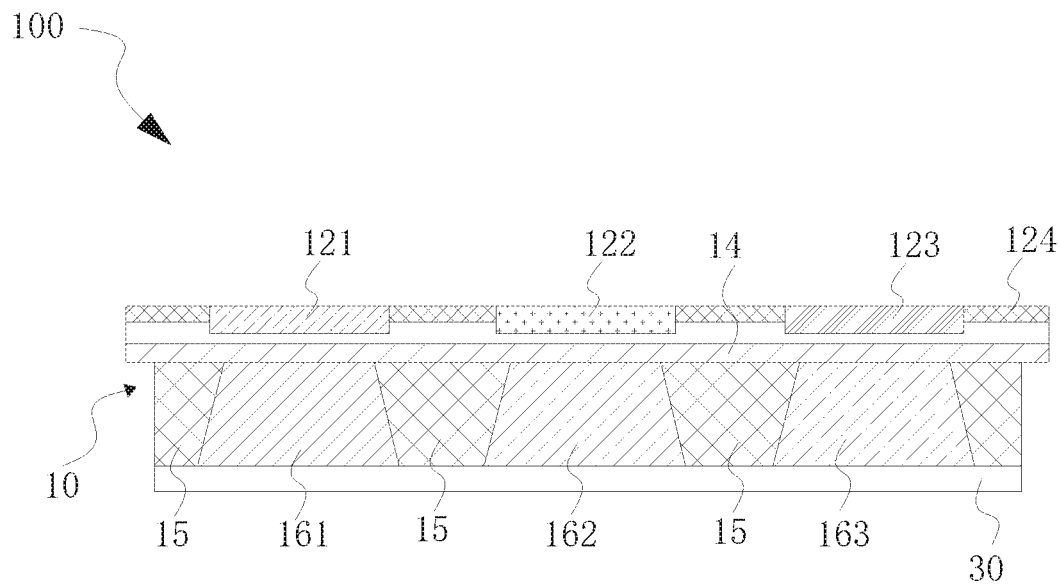
FIG. 4 is a schematic view of a display panel provided by an embodiment of the present disclosure.

As shown in FIG. 4, an embodiment of the present disclosure further provides a display panel 100, and the display panel 100 includes a backlight 30 and the above-mentioned quantum dot color filter substrate 10. The quantum dot color filter substrate 10 is prepared by the manufacturing method in the above embodiments, and structures of the quantum dot color filter substrate 10 is as described in the above embodiments. Please refer to the foregoing embodiment, and will not be repeated herein.

The quantum dot color filter substrate 10 is disposed on the backlight 30. The backlight 30 is a blue backlight.

The backlight 30 is one of a blue organic light-emitting diode (OLED), a blue micro light-emitting diode (micro-LED), and a blue mini light-emitting diode (mini-LED).

The quantum dot film layer 16 is disposed between the color filter layer 12 and the backlight 30.

Since perovskite materials have characteristics of photoluminescence, the red quantum dot film layers 161 of the quantum dot film layer 16 can convert blue light emitted by the backlight 30 into red light, the green quantum dot film layers 162 can convert the blue light emitted by the backlight 30 into green light, and the transparent film layers 163 can directly transmit the blue light emitted by the backlight 30, thereby finally achieving color display.

A transparent conductive layer is disposed under a quantum dot film layer and is externally connected to a power module to form a closed circuit. In the closed circuit, the transparent conductive layer is equivalent to a resistor, when a voltage is applied to the transparent conductive layer, the transparent conductive layer may generate heat, which can quickly remove solvents in a quantum dot film layer.

It can be understood that those of ordinary skill in the art can make equivalent replacements or changes according to the technical solutions and the concepts of the present disclosure, and all such changes and replacements should be encompassed within a protection scope of appended claims in the present disclosure.

What is claimed is:

1. A quantum dot color filter substrate, comprising:
a substrate;
a color filter layer disposed on the substrate and wherein the color filter layer comprises a plurality of red color resists, green color resists, and blue color resists arranged in an array;
a quantum dot film layer disposed on the color filter layer; and
a transparent conductive layer disposed between the color filter layer and the quantum dot film layer;
wherein the transparent conductive layer is externally connected to a power module, and a closed circuit is formed by the transparent conductive layer and the power module; and
wherein a protective layer is disposed between the transparent conductive layer and the color filter layer.

2. The quantum dot color filter substrate in claim 1, wherein the quantum dot film layer is disposed on a surface of a side of the transparent conductive layer facing away from the color filter layer.

3. The quantum dot color filter substrate in claim 1, wherein the quantum dot film layer comprises a plurality of red quantum dot film layers, green quantum dot film layers, and transparent film layers arranged in an array.

4. The quantum dot color filter substrate in claim 3, wherein each of the red quantum dot film layers corresponds to one of the red color resists, each of the green quantum dot film layers corresponds to one of the green color resists, and each of the transparent film layers corresponds to one of the blue color resists.

5. The quantum dot color filter substrate in claim 3, wherein a plurality of pixel definition layers are disposed on the transparent conductive layer at intervals, and the red quantum dot film layers, the green quantum dot film layers, and the transparent film layers are separately disposed in accommodation spaces defined by the pixel definition layers.

6. The quantum dot color filter substrate in claim 1, wherein a resistance of the transparent conductive layer ranges from 10 ohms per square meter to 18 ohms per square meter.

7. The quantum dot color filter substrate in claim 1, wherein adjacent resists of the color filter layer are separated by a black matrix.

8. A display panel, comprising a backlight and a quantum dot color filter substrate, wherein the quantum dot color filter substrate comprises:
a substrate;
a color filter layer disposed on the substrate and wherein the color filter layer comprises a plurality of red color resists, green color resists, and blue color resists arranged in an array;
a quantum dot film layer disposed on the color filter layer; and
a transparent conductive layer disposed between the color filter layer and the quantum dot film layer;
wherein the transparent conductive layer is externally connected to a power module, and a closed circuit is formed only by the transparent conductive layer and the power module; and
wherein a protective layer is disposed between the transparent conductive layer and the color filter layer.

9. The display panel in claim 8, wherein the quantum dot color filter substrate is disposed on the backlight.

10. The display panel in claim 8, wherein the backlight is one of a blue organic light-emitting diode (OLED), a blue micro light-emitting diode (micro-LED), and a blue mini light-emitting diode (mini-LED).

11. The display panel in claim 8, wherein the quantum dot film layer is disposed on a surface of a side of the transparent conductive layer facing away from the color filter layer.

12. The display panel in claim 8, wherein the quantum dot film layer comprises a plurality of red quantum dot film layers, green quantum dot film layers, and transparent film layers arranged in an array.

13. The display panel in claim 12, wherein each of the red quantum dot film layers corresponds to one of the red color resists, each of the green quantum dot film layers corresponds to one of the green color resists, and each of the transparent film layers corresponds to one of the blue color resists.

14. The display panel in claim 12, wherein a plurality of pixel definition layers are disposed on the transparent conductive layer at intervals, and the red quantum dot film layers, the green quantum dot film layers, and the transparent film layers are separately disposed in accommodation spaces defined by the pixel definition layers.

15. A manufacturing method of a quantum dot color filter substrate, comprising following steps:
- S10, providing a substrate with a color filter layer formed thereon;
- S20, forming a transparent conductive layer on the color filter layer;
- S30, connecting the transparent conductive layer and a power module to form a closed circuit;
- S40, forming a quantum dot film layer on the transparent conductive layer; and
- S50, applying a voltage to the transparent conductive layer to remove solvents in the quantum dot film layer.

16. The manufacturing method in claim 15, wherein the S40 comprises:
- printing a red quantum dot ink on the transparent conductive layer;
- printing a green quantum dot ink on the transparent conductive layer; and
- printing a blank ink comprising scattering particles on the transparent conductive layer.

17. The manufacturing method in claim 16, wherein solvents of the red quantum dot ink, solvents of the green quantum dot ink, and solvents of the blank ink are all N, N-dimethylformamide.

18. The manufacturing method in claim 15, wherein an orthographic projection of the quantum dot film layer on the transparent conductive layer is positioned in the transparent conductive layer.

* * * * *